(12) United States Patent
Schierbeek

(10) Patent No.: US 6,547,404 B2
(45) Date of Patent: *Apr. 15, 2003

(54) DIGITAL ELECTROCHROMIC MIRROR SYSTEM

(75) Inventor: Kenneth L. Schierbeek, Zeeland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/952,693

(22) Filed: Sep. 12, 2001

(65) Prior Publication Data

US 2002/0030891 A1 Mar. 14, 2002

Related U.S. Application Data

(62) Division of application No. 09/533,260, filed on Mar. 20, 2000, now Pat. No. 6,305,807, which is a continuation of application No. 08/832,380, filed on Apr. 2, 1997, now Pat. No. 6,089,721.

(51) Int. Cl.[7] .............................. G02B 5/08; G02B 17/00
(52) U.S. Cl. ........................ 359/603; 359/267; 359/608
(58) Field of Search ................................ 359/601, 602, 359/603, 608, 265, 267; 307/9.1

(56) References Cited

U.S. PATENT DOCUMENTS

| | | |
|---|---|---|
| 4,205,903 A | 6/1980 | Inami et al. |
| 4,298,870 A | 11/1981 | Saegusa ..................... 340/785 |
| 4,443,057 A | 4/1984 | Bauer et al. |
| 4,512,637 A | 4/1985 | Ballmer |
| 4,529,275 A | 7/1985 | Ballmer |
| 4,529,873 A | 7/1985 | Ballmer et al. ............. 250/201 |
| 4,603,946 A | 8/1986 | Kato et al. |
| 4,669,825 A | 6/1987 | Itoh et al. |
| 4,793,690 A | 12/1988 | Gahan et al. |
| 4,886,960 A | 12/1989 | Molyneux et al. .......... 250/209 |
| 4,896,030 A | 1/1990 | Miyaji ........................ 250/201 |
| 4,917,477 A | 4/1990 | Bechtel et al. |
| 5,076,673 A | 12/1991 | Lynam et al. ................ 359/271 |
| 5,122,647 A | 6/1992 | Lynam et al. ............ 250/201.1 |
| 5,148,014 A | 9/1992 | Lynam et al. ................ 250/214 |
| 5,193,029 A | 3/1993 | Schofield et al. ........... 359/604 |
| 5,220,317 A | 6/1993 | Lynam et al. ................ 340/785 |
| 5,384,578 A | 1/1995 | Lynam et al. ................ 345/105 |
| 5,416,313 A | 5/1995 | Larson et al. ......... 250/214 AL |

(List continued on next page.)

FOREIGN PATENT DOCUMENTS

WO    WO9914619    3/1999

OTHER PUBLICATIONS

European Search Report in Application No. EP 98 65 0021 which corresponds to the parent of the present application.

Primary Examiner—Mark A. Robinson
(74) Attorney, Agent, or Firm—Van Dyke, Gardner, Linn & Burkhart, LLP

(57) ABSTRACT

An electrochromic rearview mirror system for a vehicle includes an electrochromic reflective element having an electrochromic cell, wherein the reflective element colors to a partial reflectance level in response to a drive signal applied to the cell. The rearview mirror assembly additionally includes a drive circuit which applies a pulsed drive signal to the electrochromic cell in order to establish the partial reflectance level of the reflective element. The drive circuit controls the partial reflectance level as a function of the duty cycle of the pulsed drive signal, which has a pulse repetition rate of at least approximately 10 cycles per second and preferably at least approximately 20 cycles per second. The drive circuit additionally adjusts the amplitude of the pulses as a function of the voltage developed across the electrochromic cell.

29 Claims, 9 Drawing Sheets

U.S. PATENT DOCUMENTS

| | | |
|---|---|---|
| 5,424,898 A | 6/1995 | Larson et al. ................ 361/101 |
| 5,451,822 A | 9/1995 | Bechtel et al. ................ 307/9.1 |
| 5,530,240 A | 6/1996 | Larson et al. ......... 250/214 AL |
| 5,550,677 A | 8/1996 | Schofield et al. ........... 359/604 |
| 5,614,891 A | 3/1997 | Zeinstra et al. ........ 340/825.22 |
| 5,675,438 A | 10/1997 | Nagao et al. ................ 359/603 |
| 5,691,848 A | 11/1997 | Van Lente et al. .......... 359/601 |
| 5,715,093 A | 2/1998 | Schierbeek et al. ......... 359/601 |
| 5,786,772 A | 7/1998 | Schofield et al. ........... 340/903 |
| 5,796,176 A | 8/1998 | Kramer et al. ............. 307/10.1 |
| 5,798,575 A | 8/1998 | O'Farrell et al. .......... 307/10.1 |
| 6,056,410 A | 5/2000 | Hoekstra et al. |
| 6,089,721 A | 7/2000 | Schierbeek ................. 359/603 |
| 6,210,008 B1 | 4/2001 | Hoekstra et al. |
| 6,291,905 B1 | 9/2001 | Drummond et al. |
| 6,305,807 B1 * | 10/2001 | Schierbeek ................. 359/603 |

* cited by examiner

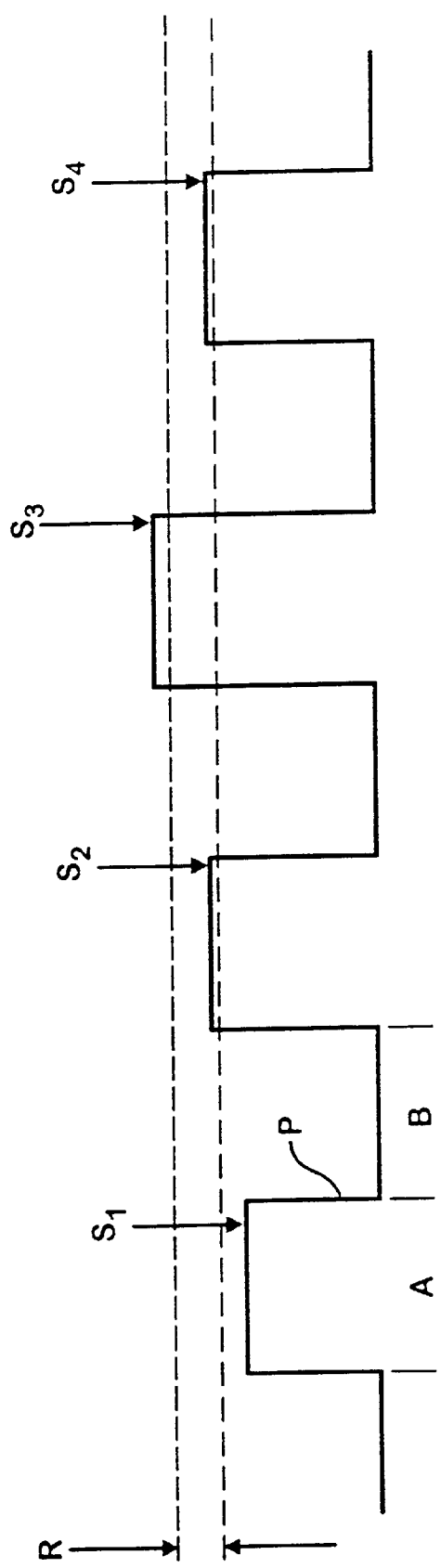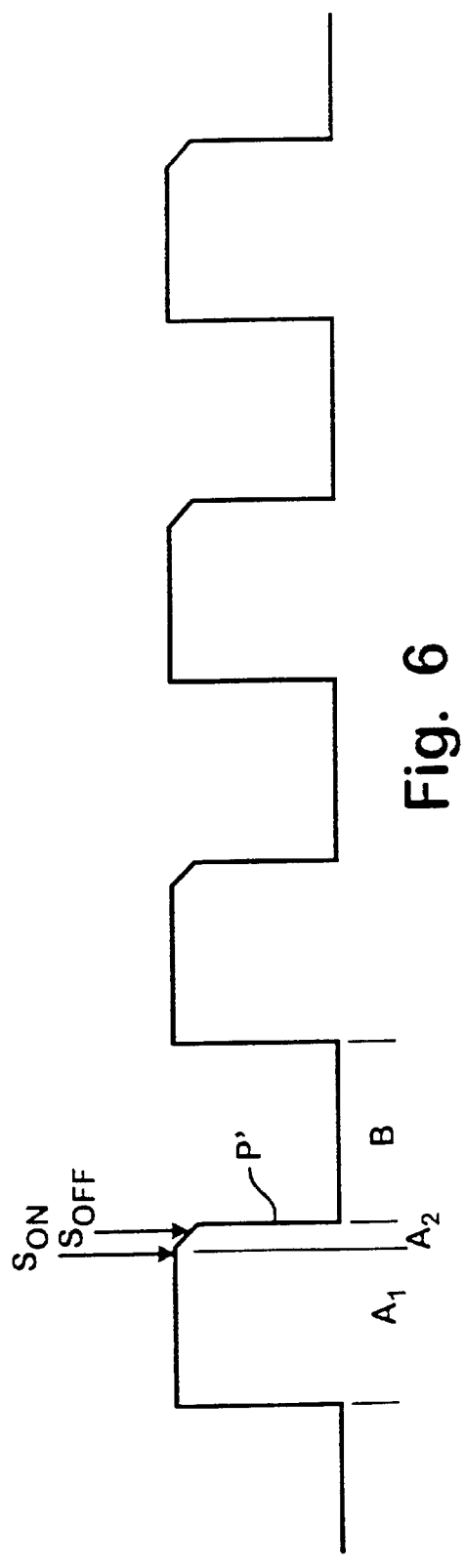

PORT SETTINGS

| STEP No. | MSB | LSB |
|---|---|---|
| 8 | 1 | 1 |
| 7 | 1 | Hi Z |
| 6 | 1 | 0 |
| 5 | Hi Z | 1 |
| 4 | Hi Z | Hi Z |
| 3 | Hi Z | 0 |
| 2 | 0 | 1 |
| 1 | 0 | Hi Z |
| 0 | 0 | 0 |

Fig. 8

DIGITAL ELECTROCHROMIC MIRROR SYSTEM

CROSS REFERENCE TO RELATED APPLICATIONS

This application is a division of application Ser. No. 09/533,260, filed Mar. 20, 2000, now U.S. Pat. No. 6,305, 807, which is a continuation of application Ser. No. 08/832, 380, filed Apr. 2, 1997, now U.S. Pat. No. 6,089,721, by Kenneth L. Schierbeek.

BACKGROUND OF THE INVENTION

This invention relates generally to vehicle rearview mirror systems and, more particularly, to electro-optic mirror assemblies, such as electrochromic rearview mirror assemblies for a vehicle.

Electrochromic rearview mirror assemblies include an electrochromic reflective element made up of a reflecting surface and an electrochromic cell positioned between the driver and the reflecting surface. The electrochromic cell responds to a direct current (DC) voltage applied across a pair of terminals by varying the light transmittance through the cell. In this manner, the reflectance level of the reflective element can be varied by varying the DC voltage applied to the electrochromic cell. The electrochromic cell has characteristics which make control of the reflectance level of the reflective element difficult. The electrochromic cell operates at a relatively low voltage, typically which may not exceed approximately 3 volts DC, more typically not more than about 1.5 volts DC, for more than a brief period of time or else useful life of the reflective element is compromised. Furthermore, the amount of drive current necessary to color or bleach the cell varies both with the temperature of the cell and the amount of change in light transmittance undertaken. Therefore, optimum control of the electrochromic cell requires more than merely applying a DC voltage corresponding to the desired reflectance level.

One approach to controlling the reflectance level of an electrochromic cell is disclosed in commonly assigned U.S. Pat. No. 5,715,093 issued to the present inventor and Niall R. Lynam, entitled AUTOMATIC REARVIEW MIRROR SYSTEM WITH AUTOMATIC HEADLIGHT ACTIVATION. In this co-pending application, the electrochromic cell is driven by an analog feedback system which translates a desired reflectance level, produced by an analog circuit, to a signal applied to the electrochromic cell which drives the cell to the desired reflectance level. While such drive system is effective, it requires the use of analog components. Such analog components would be redundant in a digital electrochromic mirror system and, therefore, would unnecessarily add to the cost of the system. However, substitution of digital components for the previously used analog components is not a straightforward matter. Digital components typically operate between discrete output states which may include binary devices, such as transistors, switches, and the like, which exhibit a low and a high state, and tristate devices, such as types of microprocessors which exhibit a neutral, a low, and a high state. Such components are useful in processing data but are not readily adapted to controlling the reflectance level of an electrochromic rearview mirror. In particular, a typical electrochromic mirror utilized as an interior mirror of a vehicle may have a surface area in the range of 90 $cm^2$ to 150 $cm^2$ and typically in the range of 110 $cm^2$ to 130 $cm^2$. A steady state current draw, after color transitions have settled, is typically in the range of between approximately 60 milliamperes and 180 milliamperes with a range of 80 milliamperes to 150 milliamperes being typical. Exterior rearview mirrors can be even larger with a surface area of approximately 350 $cm^2$, and greater, and a commensurate increase in current density.

SUMMARY OF THE INVENTION

The present invention provides a digital electrochromic mirror system which utilizes primarily digital components to drive an electrochromic cell of an electrochromic mirror system to a desired reflectance level which not only meets, but desirably exceeds the performance of prior analog systems.

According to an aspect of the invention, an electrochromic rearview mirror system for a vehicle includes an electrochromic reflective element having an electrochromic cell wherein the reflective element colors to a partial reflectance level in response to a drive signal applied to the electrochromic cell. The rearview mirror assembly additionally includes a drive circuit which applies a pulsed drive signal to the electrochromic cell in order to establish the partial reflectance level of the reflective element. The drive circuit controls the partial reflectance level at least as a function of the duty cycle of the pulsed drive signal.

According to another aspect of the invention, an electrochromic rearview mirror assembly for a vehicle includes such an electrochromic reflective element and a drive circuit which applies a drive signal to the electrochromic cell in order to establish the partial reflectance level of the reflective element. The drive circuit includes a digital controller, a binary switching device responsive to an output of the controller for applying a source to the electrochromic cell, and an input of the controller. The input of the controller is preferably responsive to the voltage developed across the electrochromic cell by the source. The digital controller closes and opens the binary switching device according to a particular duty cycle in order to control the partial reflectance level at least as a function of the duty cycle. The digital controller additionally adjusts the source as a function of the voltage developed across the electrochromic cell.

According to yet an additional aspect of the invention, an electrochromic rearview mirror assembly for a vehicle includes such an electrochromic reflective element and drive circuit which applies a drive signal to the electrochromic cell in order to establish the partial reflectance level of the reflective element. The drive circuit includes a digital controller, a first binary switching device responsive to an output of the controller for applying a source to the electrochromic cell, and a second binary switching device which is responsive to an output of the controller for draining charge from the electrochromic cell. The controller alternatingly closes the switching devices according to a particular duty cycle in order to control the partial reflectance level as a function of the duty cycle. The digital controller closes and opens the binary switching device at a repetition rate of at least approximately 10 cycles per second, more preferably at least approximately 20 cycles per second, and most preferably at least approximately 25 cycles per second.

An electrochromic rearview mirror assembly, according to the various aspects of the invention, may additionally include other functions of the rearview mirror including a display which displays the vehicle heading, determined by a compass, the outdoor temperature, determined by an outdoor temperature sensor, or both the vehicle heading and outdoor temperature. The digital controller, which is preferably a microcomputer, may additionally control the intensity of the display. The intensity of the display may be controlled as a function of light levels around the vehicle. Additionally, in particular embodiments, the display may be positioned behind the electrochromic cell wherein the display is viewed through the electrochromic cell. In such embodiments, the microcomputer may additionally adjust the intensity of the display as a function of the reflectance level of the reflective element. In this manner, the display, as perceived by the driver, does not vary in intensity as the reflectance level of the reflective element changes. However, the intensity of the display may be adjusted to accommodate the physiological response of the driver's eyes.

These and other objects, advantages and features of this invention will become apparent upon review of the following specification in conjunction with the drawings.

BRIEF DESCRIPTION OF THE DRAWINGS

FIG. 5 is a diagram of a pulsed drive signal;

FIG. 6 is the same view as FIG. 5 of an alternative embodiment thereof;

FIG. 8 is a table of source adjustment steps; and

DESCRIPTION OF THE PREFERRED EMBODIMENT

Figure 1:
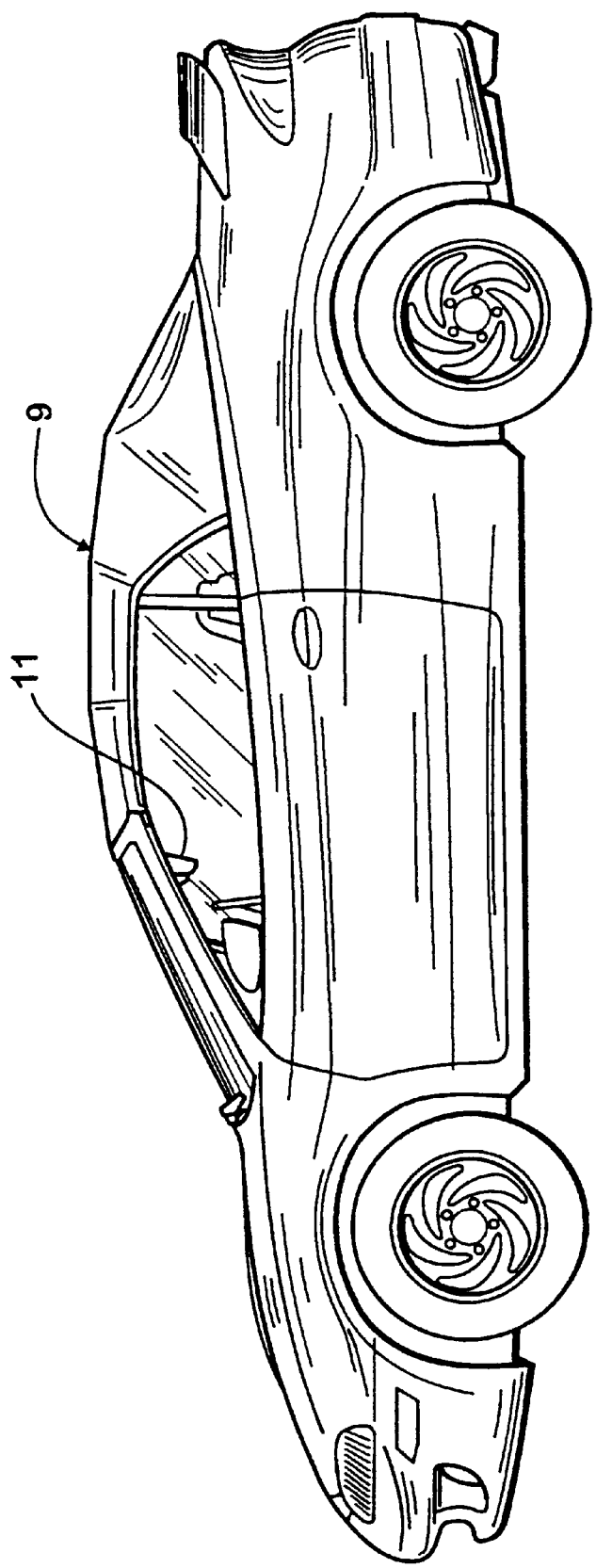
FIG. 1 is a side elevation of a vehicle having an electrochromic rearview mirror assembly, according to the invention.
Figure 2:
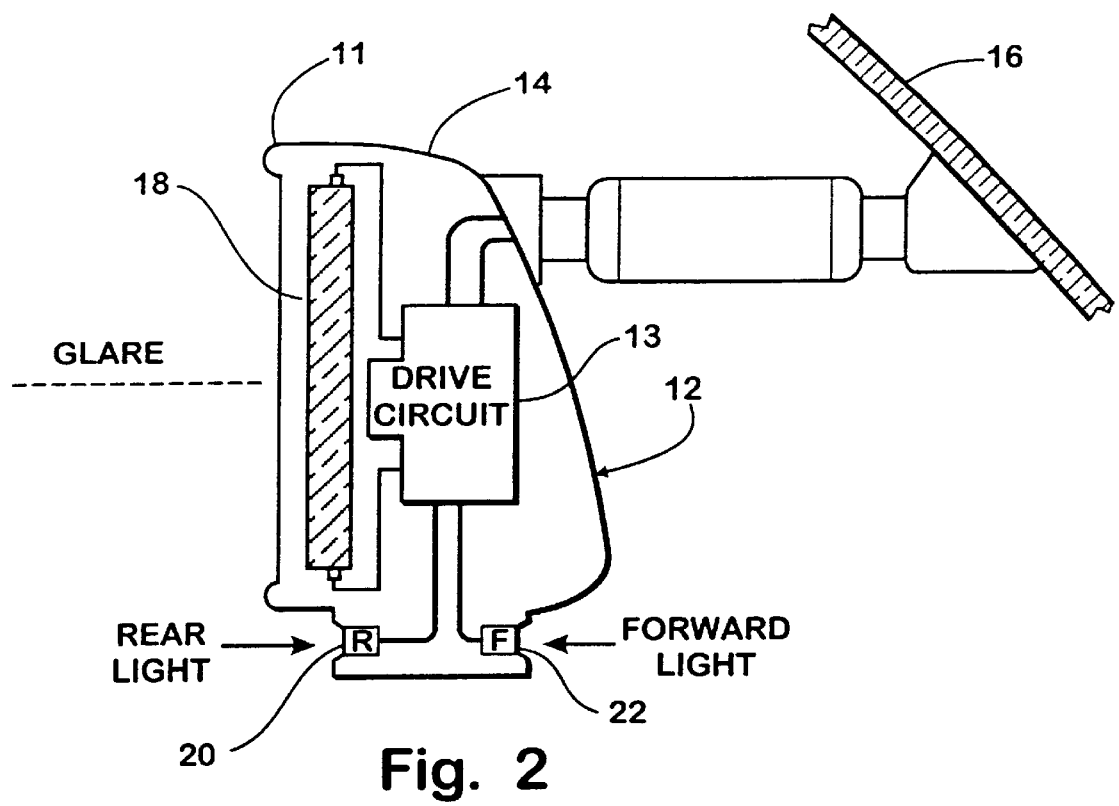
FIG. 2 is a side elevation of an electrochromic rearview mirror assembly, according to the invention, represented schematically to illustrate components of the electronic control thereof.
Figure 3:
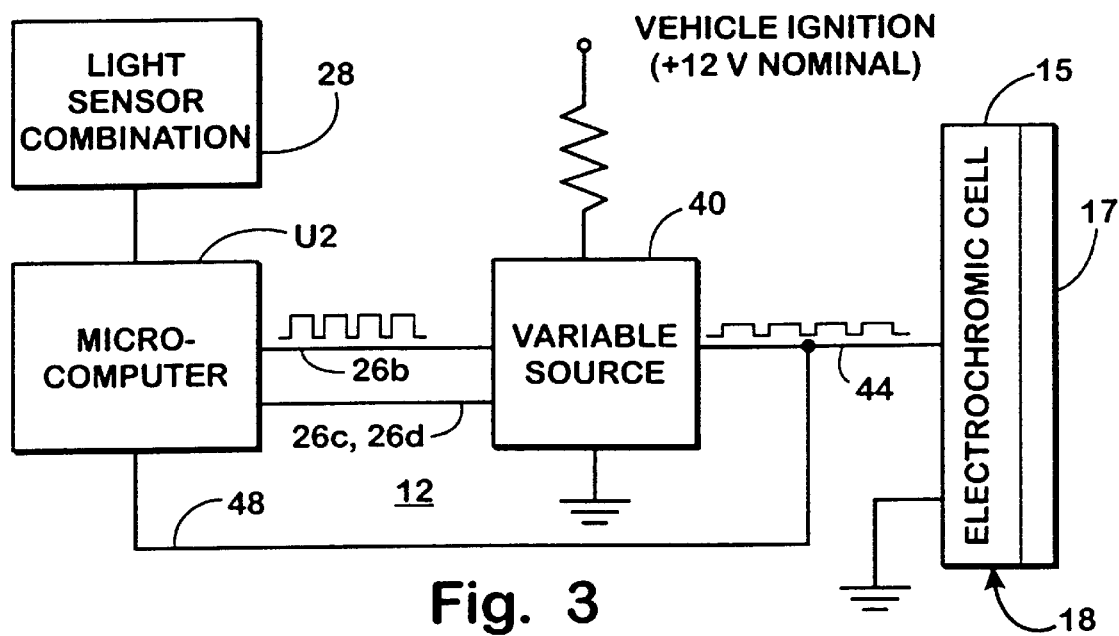
FIG. 3 is a block diagram of the electronic control in FIG. 2.

Referring now specifically to the drawings, and the illustrative embodiments depicted therein, a vehicle 9 is illustrated as having an electrochromic rearview mirror assembly 11 (FIGS. 1–3). Although the invention is illustrated in an interior rearview mirror assembly, the invention could be equally applied to exterior rearview mirror assemblies as well as to an entire electrochromic rearview mirror system. Electrochromic rearview mirror 11 includes an electronic control 12 and a variable reflectance electrochromic reflective element 18 having an electrochromic cell 15 and a reflective surface 17. Electrochromic element 18 may be of any known type, such as disclosed in U.S. Pat. No. 4,902,108 issued to Byker; commonly assigned U.S. Pat. No. 5,910,854 issued to Varaprasad et al., and commonly assigned U.S. patent application Ser. No. 08/429,643 filed Apr. 27, 1995, by Varaprasad et al., entitled ELECTROCHROMIC MIRRORS AND DEVICES, the disclosures of which are hereby incorporated herein by reference. Electrochromic element 18 dims to a partial reflectance level in response to a drive signal applied thereby.

Figure 4A:
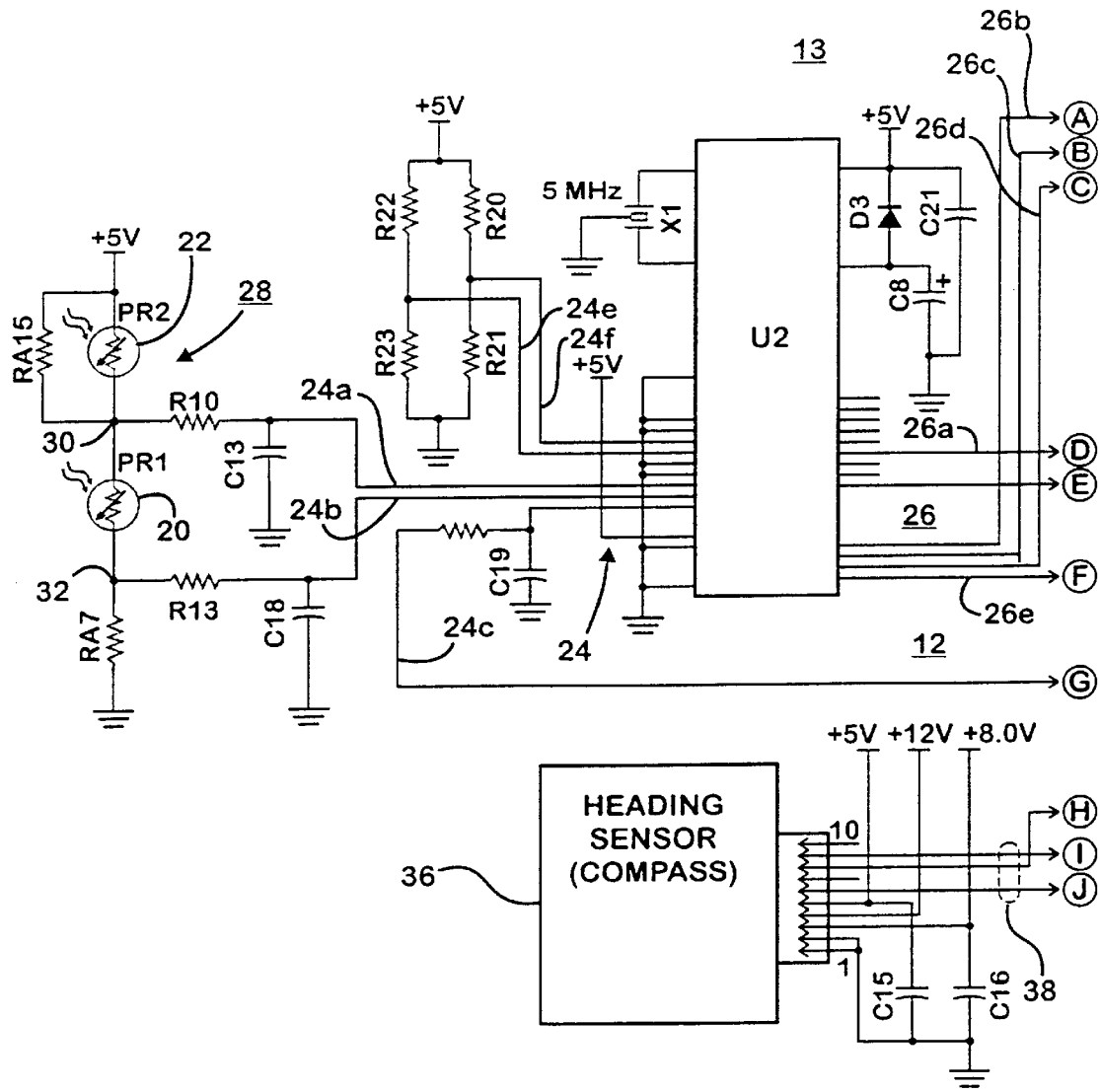
FIGS. 4a and 4b are schematic diagrams of the electronic control in FIG. 3.
Figure 4B:
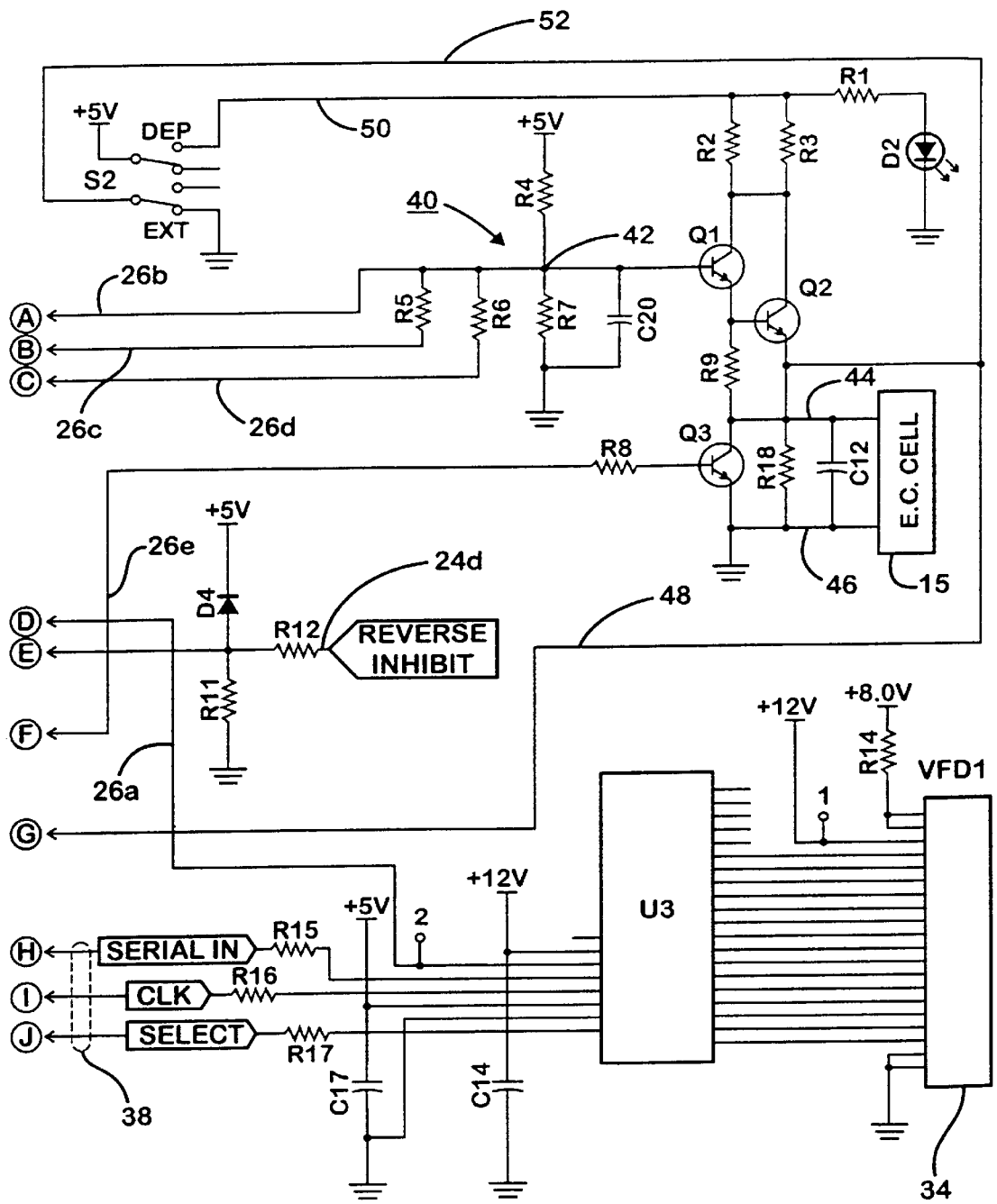

Electronic control 12 includes a drive circuit 13 which receives inputs from a substantially rearwardly directed light sensor 20 and from a substantially forwardly directed light sensor 22 and provides outputs to control the reflectance level of electrochromic partial reflective element 18. Light sensors 20, 22 make up a light sensor combination 28 which provides input to a microcomputer U2 (FIGS. 3 and 4). A digital controller, such as microcomputer U2, is a low current source, typically in microamps to less than about 25 milliamperes, which provides logic level outputs to a high current source 40 which applies direct current pulses derived from vehicle ignition voltage, typically between 8 VDC and 18 VDC with 12 VDC nominal, to the electrochromic cell source 40 which has a current capability of at least about 50 milliamperes, preferably of at least about 100 milliamperes, and most preferably of at least about 200 milliamperes. As will be described in more detail below, the duty cycle of these pulses establishes the partial reflectance level of reflective element 18. As schematically illustrated in FIG. 3, a blanking logic signal, which is typically pulse-width modulated, is output at 26b from microcomputer U2 based on the condition of highway glare light and ambient light conditions around the vehicle as detected by the light sensor combination 28. Such light sensor combinations are conventional and are described in U.S. Pat. No. 4,917,477 issued to Bechtel et al., U.S. Pat. No. 4,793,690 issued to Graham et al., and U.S. Pat. No. 3,601,614 issued to Platzer, Jr., the disclosures of which are hereby incorporated herein by reference. The logic signal output at 26 is input to high current source 40. The amplitude of the output signal from high current source 40 is variable within a narrow range established close to, and preferably constrained from significantly exceeding, the maximum voltage tolerable for a sustained period by electrochromic cell 15.

The amplitude of the pulsed output signal from source 40 can be adjusted by microcomputer U2 over outputs 26c and 26d as a function of the voltage developed across electrochromic cell 15. The developed voltage is sensed over a line 48 extending from a terminal 44 of the cell to an input of microcomputer U2. Such electrochromic cells typically develop a voltage, which is a back Electromotive Field (EMF) upon application of an external voltage thereto, and temporarily retain that back voltage, or back EMF, even when the external voltage potential is removed and the cell is open-circuited. Also, for solution-phase single compartment, self-erasing electrochromic mirror elements commonly used commercially today, the maximum voltage tolerable for a sustained period is in the 1.0 V to 2.0 V range, typically less than 1.5 V and most typically about 1.4 V. For solid-film electrochromic devices that utilize a layer, such as a tungsten oxide thin film layer, the maximum voltage tolerable for a sustained period is in the 1.0 V to the 3.0 V range, typically in the 1.3 V to 1.5 V range. Usually, application of a voltage much in excess of such maximum tolerable voltage to the electrochromic cell for a sustained period, typically at least several seconds, may cause change to the electrochromic medium in the electrochromic medium in the electrochromic cell.

In the illustrated embodiment, microcomputer U2 is marketed by Toshiba Corporation of Japan under Model No. TMP87C4008, but could be implemented by microcomputers marketed by other manufacturers. Microcomputer U2 includes a plurality of inputs 24 and a plurality of outputs 26. Outputs 26 are tri-state outputs which are capable of assuming a low state in which the output is pulled to ground, a neutral high impedance state in which the output is effectively open-circuited, and a high state in which the output is driven to a positive, or negative, DC voltage. Inputs 24a and 24b are connected with light sensor combination 28 made up of rearward-directed light sensor 20 and forward-directed light sensor 22 electrically connected in series with each other and with a resistor RA7. This series circuit is connected between a positive source of voltage ($^+$5V) and ground. Input line 24a is connected with a junction, or node, 30 between light sensors 20 and 22. Input 24b is connected with a junction, or node, 32 between rearward light sensor 20 and resistor RA7. As disclosed in detail in commonly assigned U.S. Pat. No. 5,715,093 issued to Schierbeek et al., for an AUTOMATIC REARVIEW MIRROR SYSTEM WITH AUTOMATIC HEADLIGHT ACTIVATION, the disclosure of which is hereby incorporated herein by reference, the voltage at node 30 is used to establish a reflectance level of electrochromic reflective element 18. The voltage at junction 32 is representative of the overall light level surrounding vehicle 9 and is used in a manner which will be described below.

In the illustrative embodiment, electronic control 12 includes a display 34 which is driven by a display driver U3. In the illustrated embodiment, display 34 is marketed by National Electric Corporation under Model No. FIP2QMBS and driver U3 is marketed by Allegro under Model No. UNC5812EPF, although other commercially available components may also be used. Display 34 may be positioned behind electrochromic cell 15 of reflective element 18 and viewed by the driver through the electrochromic cell, as disclosed in U.S. Pat. No. 5,285,060, issued to Larson et al., for a DISPLAY FOR AUTOMATIC REARVIEW MIRROR, the disclosure of which is incorporated herein by reference. Alternatively, display 34 may be positioned on a lip portion of housing 14 below reflective element 18 or on any other portion of the housing visible to the driver as illustrated in commonly assigned U.S. Pat. No. 5,786,772 issued to Schofield et al., for a VEHICLE BLIND SPOT DETECTION DISPLAY SYSTEM, the disclosure of which is hereby incorporated herein by reference. Alternatively, display 34 could be in the form of a heads-up display projected from housing 14 on the vehicle windshield 16.

Electronic control 12 may additionally include a heading sensor, or compass, 36 which produces outputs 38 indicative of the heading of the vehicle. Such heading sensor may be of the magneto-resistive type, such as disclosed in commonly assigned U.S. Pat. No. 5,255,442, issued to Schierbeek et al., for a VEHICLE COMPASS WITH ELECTRONIC SENSOR, or may be of the magneto-inductive type, such as disclosed in commonly assigned U.S. Pat. No. 5,924,212 issued to Domanski for an ELECTRONIC COMPASS, the disclosures of which are hereby incorporated herein by reference, or may be of the flux-gate type, or may be of the magneto-capacitive type. The heading of the vehicle detected by heading sensor 36 is encoded on outputs 38, decoded by driver U3 and displayed by display 34.

Microcomputer U2 includes an output 26a, which controls the intensity of display 34. In the embodiment illustrated in FIGS. 4a and 4b, microcomputer U2 provides a signal on line 26a which adjusts the intensity of display 34 according to the light level around the vehicle as provided on input 24b. As disclosed in the Larson et al. '060 patent, microcomputer U2 reduces the intensity of display 34 during low light levels in order to avoid dazzling the driver. During high light levels, microcomputer U2 increases the intensity of display 34 in order to make the display more discernable to the driver. If display 34 is positioned behind cell 15, wherein the output of the display is viewed through cell 15, microcomputer U2 additionally adjusts the intensity of display 34 as a function of the light transmission level of cell 15 in order to compensate for attenuation of light transmission by the cell. This is accomplished by increasing the intensity of display 34 for lower reflectance levels of electrochromic reflective element 18 resulting from coloration of cell 15 to a lower light transmission level as disclosed in the Larson et al. '060 patent.

Electronic control 12 includes a source 40 for supplying direct current energy to color cell 15 to a partial light transmission level. Source 40 is made up of a voltage divider composed of resistors R4 and R7 connected in series between a $^+5$ volt source and ground. A node 42 of the voltage divider is supplied to a Darlington transistor pair Q1 and Q2 which apply a DC voltage to a first terminal 44 of cell 15. Another terminal 46 of cell 15 is connected with ground. As is known in the art, the voltage applied to the base of transistor Q1 is decreased by two forward base-emitter drops and applied to terminal 44. In the illustrated embodiment, resistors R4 and R7 are selected to apply a nominal voltage of approximately 1.35 to 1.4 volts to cell 15. This range may vary depending upon the particular type of electrochromic cell. A transistor Q3 is connected directed across terminals 44 and 46. When a voltage is applied to the base of transistor Q3 sufficient to drive Q3 into saturation, an essentially short circuit is applied across cell 15 which rapidly removes at least a portion of the charge applied to the cell. Microcomputer U2 controls the states of transistors Q1–Q3 in a binary fashion, wherein each transistor is either conducting or open-circuited, and adjusts the output level of source 40, by controlling outputs 26b, 26c, 26d and 26e in a manner which will be described below.

Output 26b, when in a neutral high impedance state, does not substantially affect the voltage at node 42 whereby the voltage at node 42 is established solely by resistors R4 and R7. This voltage drives transistors Q1 and Q2 into conduction and applies a voltage level, dependent on the voltage of source 40 to cell 15. When output 26b is driven to a low state, the voltage at node 42 is decreased to a level at which transistors Q1 and Q2 become open-circuited and no current is supplied to cell 15. In the illustrated embodiment, output 26b is not driven to a high state, although, in other embodiments, the high-output state may be useful if appropriate adjustments are made to the circuit.

Outputs 26c and 26d serve as "fine" and "coarse" adjustments, respectively, to the voltage level at node 42. When output 26d, which is the "coarse" adjustment, is in a neutral high impedance state, the output has no effect on the voltage at node 42. When output 26d is driven to a low state, a resistor R6 is placed in parallel with resistor R7, which decreases the voltage at node 42. When output 26d is driven to a high state, resistor R6 is essentially in parallel with resistor R4 which increases the voltage at node 42. Likewise, when "fine" adjustment output 26c is neutral, it has no effect on the voltage at node 42. When output 26c is driven low, a resistor R5 is placed in parallel with resistor R7 which decreases the voltage at node 42, and when output 26c is driven high, resistor R5 is placed in parallel with resistor R4, which increases the voltage level at node 42. Because resistor R6 has a low resistance value than resistor R5, the effect of output 26d is greater than that caused by output 26c.

Output 26e controls the conductive state of transistor Q3. When output 26e is in a neutral high impedance state, there is no base driven to transistor Q3 and Q3 is open-circuited. When output 26e is driven high, transistor Q3 is driven to a conductance state, which, as previously set forth, places a substantially short circuit across cell 15 which, as is known in the art, removes at least a portion of the charge on cell 15.

Terminal 44 of cell 15 is interconnected through a line 48 and a resistor R19 to an input 24c of microcomputer U2. This provides an input to microcomputer U2, which represents the voltage across cell 15. This voltage is buffered by resistor R19 in order to avoid damage to microcomputer U2 by spurious voltages on the cell. A capacitor C19 maintains the voltage level at input 24c against fluctuation during each analog-to-digital conversion carried out internally by microcomputer U2. As is known in the art, the voltage level across cell 15 is generally, but not necessarily precisely, related to the degree of coloration of light transmission level of cell 15. In this manner, microcomputer U2 is provided with information concerning the general reflectance level of reflective element 18. This information is collected and used in a manner which will be set forth below.

Electronic control 12 additionally includes a switch S2 which is driver-operable in order to switch the rearview mirror between an "automatically controlled" state in which the reflectance level of reflective element 18 is controlled and an "off" state in which the reflectance level of reflective element 18 is not controlled. One wiper of switch S2 is connected with an 8.0 volt source and is selectively connectable with a line 50 which supplies voltage to transistors Q1 and Q2. Therefore, when in the position illustrated in FIG. 3, no voltage is supplied to the transistors, and the cell remains in a high reflectance state. Additionally, switch S2 includes a wiper which is connected through a line 52 connected with terminal 44. When in the position illustrated in FIG. 3, terminal 44 is directly connected with ground which rapidly bleaches the cell to a high reflectance condition. Alternatively, polarity to the cell could be reversed to provide a power bleach. Electronic control 12 additionally includes a reverse-inhibit input 24d which causes microcomputer U2 to force output 26b to a low state and output 26e to a high state and thereby bleaches cell 15 when the vehicle is in reverse gear. Electronic control 12 additionally includes an indicator D2, which, when actuated, indicates to the driver that the control is actively controlling the reflectance level of reflective element 18.

Electronic control 12 may additionally, optionally, include a series of resistors R20–R23 which are connected as illustrated as voltage dividers in order to supply inputs 24e and 24f to microcomputer U2. Inputs 24e and 24f establish the sensitivity of microcomputer U2 to signals received from light sensor combination 28 and may be changed in value for different vehicle configurations in which rearview mirror 11 is provided. Sensitivity settings may additionally be stored in Erasable Electrically Programmable Read-Only Memories (EE-PROM) and thereby electrically selectable for the vehicle type in which rearview mirror 11 is positioned. Additionally, such EE-PROM (not shown) may be used to provide characterization data of light sensors 20 and 22 in order to allow different light sensors to be utilized and to make compensation for the different characteristics of each light sensor for use by microcomputer U2. In known electrochromic drive circuits, it is necessary to adjust the values of resistors RA7 and RA15 in order to compensate for variations in light sensors 20, 22. This is typically accomplished either by providing a variable potentiometer to make production-line calibration adjustments or by characterizing each light sensor and matching up suitable values of resistors RA7 and RA15. Both procedures are cumbersome. With the use of an EE-PROM, the characterization data of the light sensors can be stored in the EE-PROM and used to compensate for variations in light sensor characteristics. For example, variations which previously would have been compensated for by selecting the value of resistor RA7, can be compensated for by internal set point variations in the algorithm used by microcomputer U2. Variations which previously would have been compensated for by selecting the value of resistor RA15 can be compensated for by providing a resistor between a part of microcomputer U2 and a terminal of resistor RA15, with the microcomputer selecting, a high output state for that part to lower the resistance value of resistor RA15, or a neutral state to not affect the resistance of resistor RA15. Microcomputer U2 may additionally be provided with linearization data, whereby the voltage level at node 30, which varies non-linearly for various light levels sensed by sensors 20 and 22, may be interpreted linearly for the purpose of producing a drive signal to drive cell 15 to a particular reflectance level.

In operation, microcomputer U2 switches output 26b between a neutral high impedance state and a low state in order to pulse transistors Q1 and Q2 together and thereby apply a pulsed direct current to cell 15. In contrast to conventional electrochromic element drive circuits which supply a steady DC voltage level in order to control the reflectance level of reflective element 18, microcomputer U2 controls the reflectance level of the reflective element by varying the duty cycle of the pulsed signal applied to cell 15. Such a pulsed signal P is illustrated in FIG. 5 and is shown as having an approximately 50 percent duty cycle. As the duty cycle decreases in percent on-time verses off-time for transistors Q1 and Q2, the current supply to cell 15 decreases and thereby the reflective element assumes a high reflectance condition. In contrast, as the duty cycle of signal P increases, by switching transistors Q1 and Q2 on for a greater percentage of time as compared to the off period of these transistors, a greater amount of charge is supplied to cell 15 and thereby the cell colors electrochromic reflective element 18 assumes a lower reflectance level.

Microcomputer U2 is capable of providing a pulsed DC supply to cell 15 according to a variable duty cycle, and thereby is capable of establishing a particular reflectance level for reflective element 18, by relying upon the natural tendency of cell 15 to discharge itself during periods when current is not being supplied by transistors Q1 and Q2. In the illustrated embodiment, discharge of cell 15, when not being charged through transistors Q1 and Q2, is enhanced by transistor Q3 which actively discharges cell 15 between pulses of DC supplied by transistors Q1 and Q2. Thus, by reference to FIGS. 4a and 4b, during period A, transistors Q1 and Q2 are driven in order supply a DC level, which is illustrated as being positive but could also be negative, to the cell. During period B, after microcomputer U2 has turned off transistors Q1 and Q2, transistor Q3 is driven to a conductive state in order to rapidly discharge cell 15. This provides superior control over the response of cell 15 to the variable duty cycle pulse train supplied from source 40 under the control of microcomputer U2 than would be achieved by control of only the application of the source to the cell. Microcomputer U2 can vary the duty cycle of drive signal P from zero percent (0%) to one hundred percent (100%).

Other factors besides the duty cycle of the drive signal P influence the coloration of cell 15. For example, if the amplitude of each pulse is too high, the expected useful life of reflective element 18 may decrease. If the amplitude of each pulse is too low, the cell will not color to the desired level and thereby the reflectance level of reflective element 18 will be too high. However, the ability to control the amplitude of each pulse in drive signal P is made difficult by the electrical characteristics of cell 15 which vary both with temperature and the degree of charge on the cell as well as tolerances in all of the electrical components. By way of example, if cell 15 is completely discharged, the cell will provide a greater electrical load and will tend to lower the amplitude of any pulse applied to the cell. However, if the charge on cell 15, which is represented by the voltage across the cell, is high relative to the amplitude of the pulse being applied, the cell will present a relatively small load on the pulse and the amplitude of the pulse will not be lowered. In order to provide control over the amplitude of the DC pulses applied to cell 15, electronic control 12 includes a feedback loop through microcomputer U2 utilizing input 24c to monitor the voltage across cell 15 through line 48 which connects with terminal 44 of the cell. This input monitors the voltage across the cell produced by each pulse. If the voltage is too low, the amount of drive applied to the next pulse is increased. If the voltage produced across the cell is too high, thereby potentially reducing the lifetime of the cell, microcomputer U2 lowers the amplitude of the next pulse. If the voltage across cell 15, as sampled by input 24c is within a desirable range, then microcomputer U2 keeps the same amplitude for the next pulse.

As can be seen by reference to FIG. 5, microcomputer U2 monitors the voltage across cell 15 by sampling the voltage on the cell at point S which is selected to be at the end of the applied pulse. At point S, the voltage produced across cell 15 by that pulse will have presumably stabilized so that the measured voltage is assumed to be an accurate representation of the voltage across the cell. Of course, it may be possible to monitor the voltage across the cell at other points on the pulse or to measure the amplitude at several points and average the results. By reference to FIG. 5, the pulse sampled at S1 is determined by microcomputer U2 to produce a voltage across cell 15 which is below the range R established for the particular cell. Therefore, microcomputer U2 increases the amplitude of source 40 for producing the next pulse, the effect on cell 15 of which is sampled at S2. Because, in the illustration, microcomputer U2 determines that the sampled voltage across cell 15 at S2 is within range R, no adjustment is made to the amplitude of source 40 for the next pulse. When a sample S3 is made of the voltage across cell 15 during the next pulse, the sampled voltage is greater than range R which causes microcomputer U2 to lower the amplitude of source 40 for producing the next pulse which is sampled at S4.

As set forth above, microcomputer U2 is capable of adjusting the amplitude of source 40 at node 42 and thereby the amplitude of the pulse applied to the cell by controlling the states of outputs 26c and 26d. This is accomplished digitally utilizing the port settings illustrated in FIG. 8. By reference to FIG. 8, eight steps of voltage adjustment are available to the microcomputer by selecting a Most Significant Bit (MSB) as the "coarse" output 26d and a Least Significant Bit (LSB) as "fine" output 26c. By reference to FIG. 8, if no change is required in the voltage level of source 40, a step number 4 is selected which provides a neutral high impedance state on outputs 26c and 26d. In order to decrease the voltage level of source 40, a lower step number is selected. The greatest reduction of voltage is achieved by step number 0 in which ports 26c and 26d are both driven to low states which are represented by a 0. Conversely, if microcomputer U2 wishes to raise the voltage of source 40, a step higher than 4 is selected, with step 8 being the greatest increase.

Electronic control 12 operates as follows. Periodically microcomputer U2 monitors the voltage at node 30 utilizing input 24a which includes an internal Analog-to-Digital (A/D) converter. Microcomputer U2 computes the Pulse With Modulation percentage (PWM %) corresponding to the sensed light level according to formula 1:

$$PWM\ \% = G(C_S - V_{A/D}) \quad (1)$$

where:
  G=Gain (a constant);
  Cs=Voltage at the start of color of the cell; and
  $V_{A/D}$=A/D voltage at input 24a.

Ideally, PWM % will equal to 0 when the A/D voltage is equal to the voltage at which it is desired to begin coloration of the cell 15. As the voltage on node 30 decreases, the PWM % increases until the PWM % equals 100 percent. If formula 1 yields a negative value, microcomputer U2 sets the PWM % to 0. Any values greater than 100 PWM % are kept at 100 PWM %.

Figure 7:
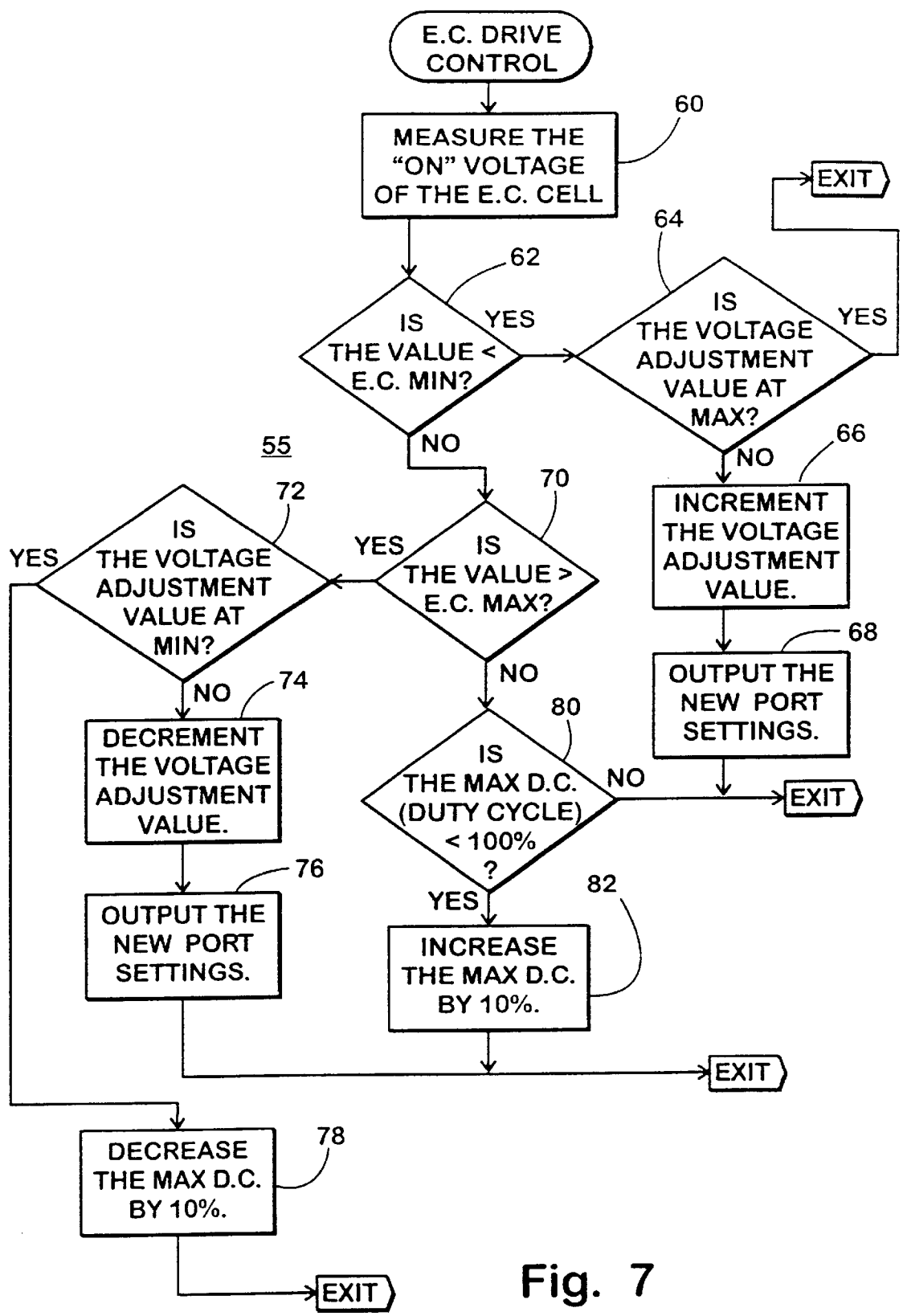
FIG. 7 is a software flowchart of a control algorithm for an electrochromic rearview mirror assembly.

Once microcomputer U2 determines the PWM % utilizing formula 1, a control algorithm 55 is carried out (FIG. 7). The voltage across cell 15 is measured at 60 at point S and it is determined at 62 whether the sample voltage is below the value of EC MIN, which, in the illustrated embodiment is set to 1.35 volts. If the voltage is less than EC MIN, it is determined at 64 whether the voltage adjustment has been set to the maximum value. If not, the port settings are incremented at 66 and the new port settings are applied to source 40 at 68 in order to adjust the amplitude of the next pulse supplied to cell 15. If it is determined at 64 that the port setting is at a maximum value, then no additional adjustment is possible.

If it is determined at 62 that the sample voltage across the cell is not less than the minimum, it is determined at 70 if the sample voltage is greater than EC MAX. In the illustrated embodiment, EC MAX is approximately 1.40 volts. If it is determined at 70 that the sample cell voltage is greater than EC MAX, then a similar adjustment is made to the amplitude of source 40 for the next pulse, except in the opposite direction, as follows. At 72, it is determined whether the minimum voltage adjustment has been achieved. If not, the setting is decremented at 74 and the new port settings are outputted at 76 in order to adjust downwardly the amplitude of source 40. If it is determined at 72 that the voltage adjustment value is at a minimum, then a parameter MAX DC is decreased by a value, such as 10 percent at 78. MAX DC is a maximum duty cycle that microcomputer U2 will apply to cell 15 and is used in order to prevent prolonged over-stimulation of the cell. By decreasing the value of MAX DC, temporary over-voltage pulses are applied to the cell according to a lower duty cycle and thereby reducing the effect of the over-voltage condition on the cell.

If it is determined at 70 that the sampled voltage across the cell is not greater than EC MAX, then the sample voltage is within the desired range R. It is then determined at 80 whether the value of MAX DC is less than 100 percent. If it is determined at 80 that the value of MAX DC is less than 100 percent, the value of MAX DC is increased at 82 by 10 percent. This allows microcomputer U2 to drive the cell at a higher duty cycle, closer to, or equal to, 100 percent, provided that the voltage produced on the cell is within range R.

Alternatively, a drive signal P', having a variable duty cycle, may be utilized to drive cell 15 to the desired reflectance level of reflective element 18 (FIG. 6). Drive signal P' includes three distinct periods. During period A1, transistors Q1 and Q2 are in conduction which applies a current from source 40 to charge cell 15. In period B, microcomputer U2 opens transistors Q1 and Q2 and closes transistor Q3 in order to drain the charge on cell 15. During a period A2, between periods A1 and B, all transistors Q1–Q3 are open-circuited. At the end of period A1, microcomputer U2 samples the voltage across cell 15 at a point represented by $S_{ON}$. During period A2, when cell 15 is being neither stimulated nor drained, a second sample $S_{OFF}$ is made by microcomputer U2 of the voltage across cell 15. This sample made during $S_{OFF}$ can be utilized by microcomputer U2 in order to obtain an approximation of the level of coloration of cell 15. This information may then be used by microcomputer U2 in order to determine, for example, if the reflectance level desired of cell 15 is significantly greater than the present approximate reflectance level of cell 15. This information can be used in many ways. For example, if the sample taken at $S_{OFF}$ indicates that cell IS is in a high light transmission condition, whereby reflective element 18 is at a high reflectance level, and it is determined that the reflectance level of the reflective element must be significantly decreased, then microcomputer U2 may temporarily, intentionally, apply a voltage which is greater than EC MAX and/or a duty cycle which is greater than that which corresponds to the selected reflectance level, in order to increase the rate of coloration of cell 15 utilizing the principles disclosed in commonly owned U.S. Pat. No. 5,220,317, issued to Lynam et al., for an ELECTROCHROMIC DEVICE CAPABLE OF PROLONGED COLORATION, the disclosure of which is hereby incorporated herein by reference. Likewise, if it is determined at $S_{OFF}$ that the transmission level of cell 15 is very low, whereby the reflectance level of reflective element 18 is low, and it is desired to rapidly increase the reflectance level of the element, microcomputer U2 may intentionally apply a voltage and/or duty cycle which is temporarily below target to more quickly achieve the desired reflectance level.

Figure 9A:
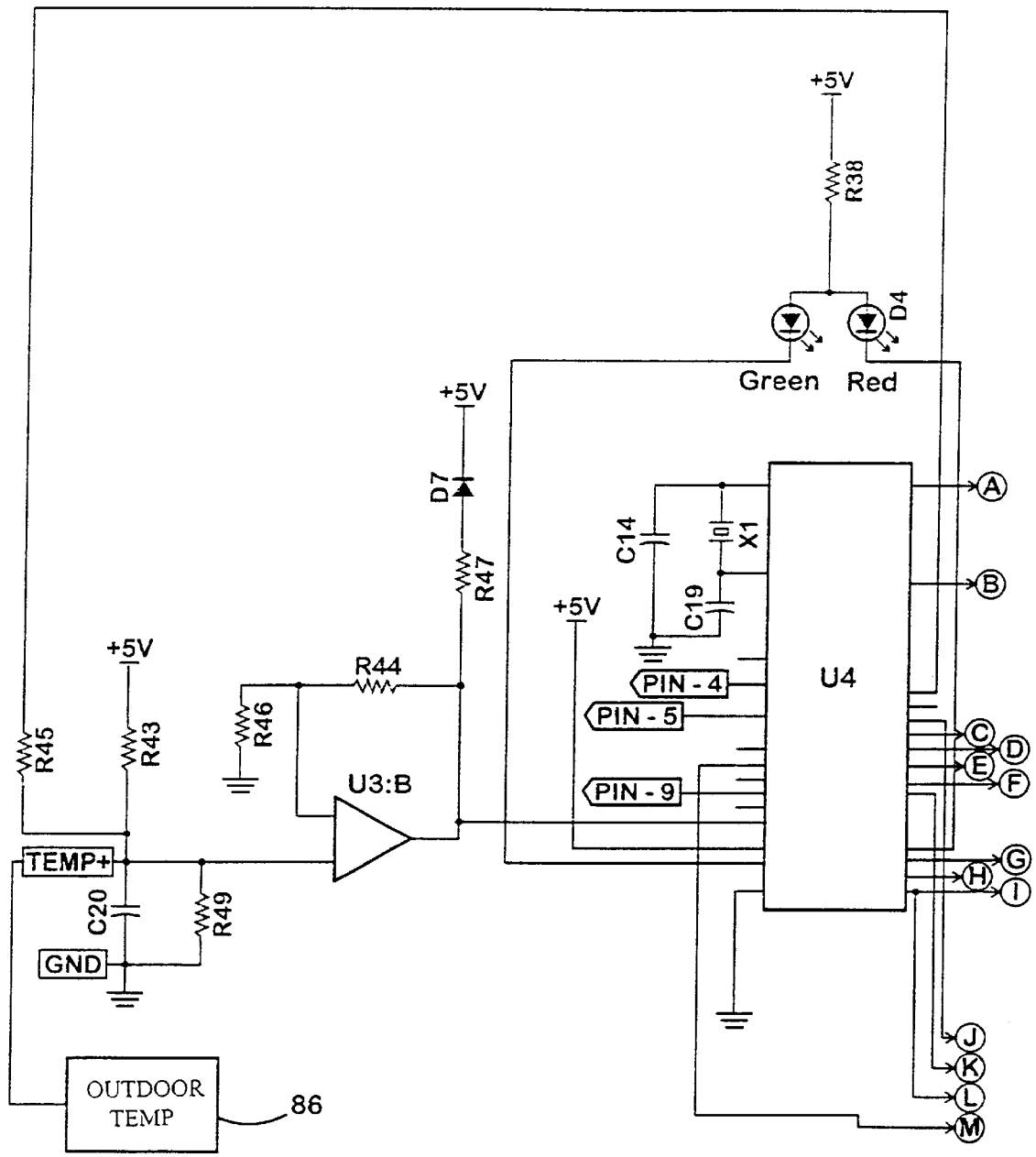
FIGS. 9a and 9b are schematic diagrams of an alternative embodiment control.
Figure 9B:
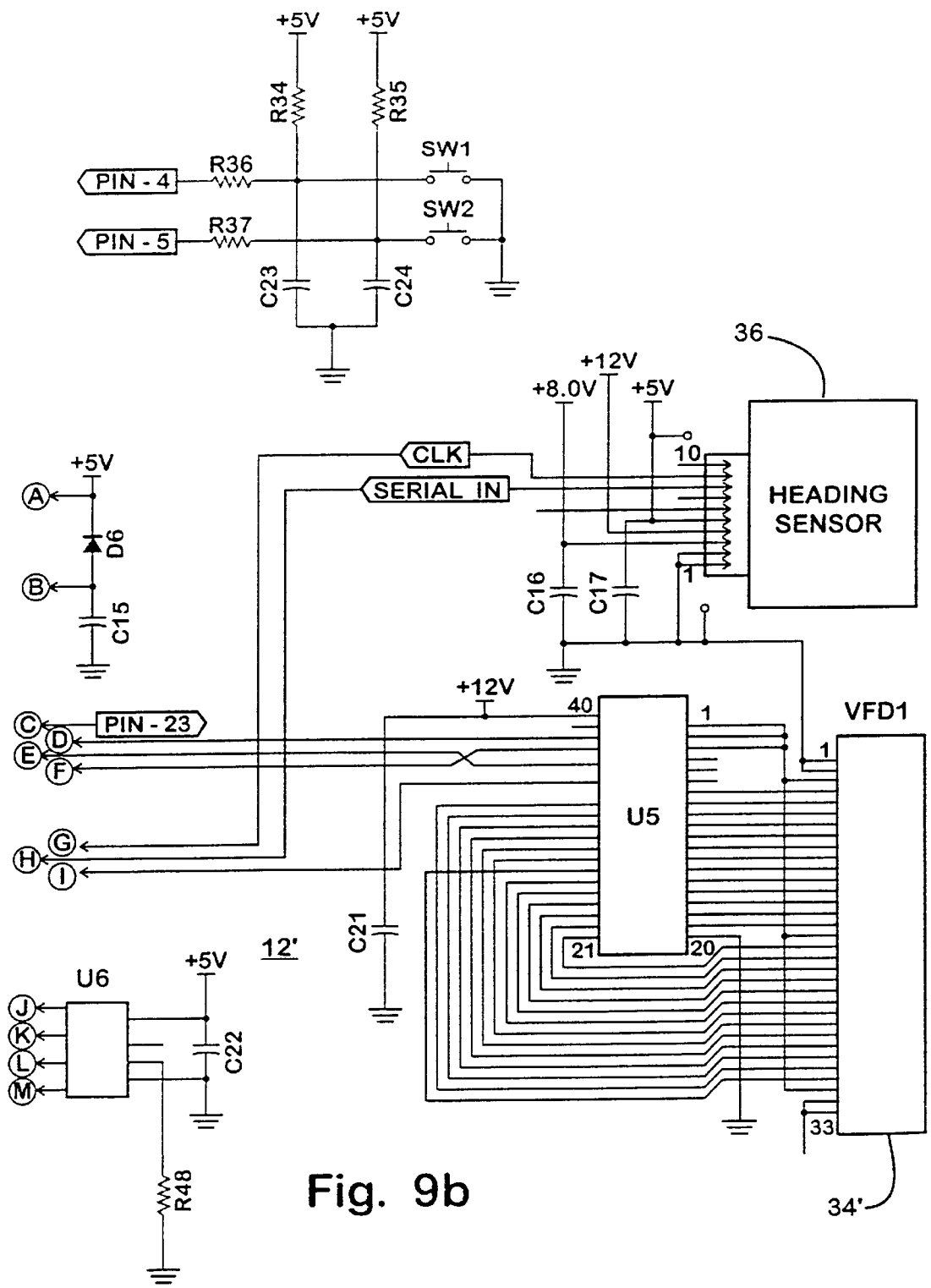

An alternative electronic control 12' is illustrated in FIGS. 9a and 9b, which includes an outdoor temperature sensor 86 utilized to supply an input to a microcomputer U4 for display on a display 34'. Additionally, electronic control 12' provides control over indicators D4 by microcomputer U4. Indicators D4, which are red and green in color, may provide an indication to the driver that the electrochromic control function is operating according to high sensitivity (green), operating according to a low sensitivity (red), or is completely off. In this embodiment, sensitivity of the drive circuit is user selectable utilizing soft-touch switches S1 and S2 mounted on housing 14. Electronic control 12' controls the intensity of display 34' according to light levels surrounding the vehicle as determined by the voltage at the light sensor (not shown in FIGS. 9a and 9b). Additionally, microcomputer U4 controls the intensity of indicators D4 according to light levels surrounding the vehicle. In this manner, the light levels of the indicators, as well as that of the display, are controlled according to the physiological condition of the driver responding to light levels surrounding the vehicle.

It has been determined that the repetition rate of the pulses in drive signals P and P' (FIGS. 5 and 6) should be above approximately 10 cycles per second (Hz) to avoid any significant perception of flickering of the reflectance level of the reflective element. While any repetition rate greater than 10 Hz is desirable, a repetition rate above approximately 20 Hz is preferred and a repetition rate above 25 Hz is most preferred. For example, for electrochromic mirrors which color from 65% to 20% reflectivity in a time period of less than about 4 seconds, it has been found that a repetition rate of 20 Hz produced no perceivable flicker to a human observer.

Thus, it is seen that the present invention utilizes digital logic control, which is incorporated into vehicle functions, such as vehicle heading display and temperature sensing and display, in order to perform functions which require handling of a significant amount of current while maintaining a high degree of control over applied voltage to the electrochromic cell. By controlling the reflectivity level of the mirror, or mirrors, utilizing the duty cycle of a Pulse-Width Modulated (PWM), or a blanking, signal, the information processing capabilities of digital logic may be applied to the unique problem of controlling an electrochromic rearview mirror element. Although the invention is illustrated as implemented with a microcomputer, other digital logic circuits, such as programmable arrays and the like, may be utilized.

The present invention can be used with interior rearview mirror assemblies equipped with a variety of features, such is a high/low (or daylight running beam/low) headlamp controller, a hands-free phone attachment, a video camera for internal cabin surveillance and/or video telephone function, seat occupancy detection, a cellular phone microphone, map-reading lights, compass/temperature display, fuel level and other vehicle status display, a trip computer, an intrusion detector, contacting rain sensors, non-contacting rain sensors, and the like. Such features can share components and circuitry with the electrochromic mirror circuitry and assembly so that provision of these extra features is economical.

The digital electrochromic mirror system of this invention can be utilized in a vehicle that utilizes a car area network, such as is described in Irish Patent Application No. 970014 entitled A VEHICLE REARVIEW MIRROR AND A VEHICLE CONTROL SYSTEM INCORPORATING SUCH MIRROR, filed Jan. 9, 1997, the disclosure of which is hereby incorporated by reference herein and can be a node of that car area network, or, when multiplexing is used, such as is disclosed in U.S. Pat. No. 5,798,575 entitled VEHICLE MIRROR DIGITAL NETWORK AND DYNAMICALLY INTERACTIVE MIRROR SYSTEM, issued to O'Farrell et al., the disclosure of which is hereby incorporated by reference herein. Also, given that an interior electrochromic mirror can optionally be equipped with a myriad of features (such as map lights, reverse inhibit line, headlamp activation, external temperature display, remote keyless entry control, and the like), it is useful to equip such assemblies with a standard connector (for example, a 10-pin parallel connector) so that a common standard wiring harness can be provided across an automaker's entire product range. Naturally, multiplexing within the vehicle can help alleviate the need for more pins on such a connector or allow a given pin or set of pins control more than one function.

Using the concepts of the present invention, a drive voltage at, or close to, the maximum voltage tolerable by the electrochromic mirror element (EC MAX) can be selected (for example, 1.4 V) and, using this voltage EC MAX as a modulated, or a blanking, signal, the reflectivity of the electrochromic reflective element can be controlled to any partial reflectance level within its range of reflectance levels from its maximum (bleached) reflectivity to its minimum (fully dimmed) reflectivity by, for example, varying the duty cycle of the modulated signal. The continuously variable control of mirror reflectivity, also referred to as "gray-scale control," is achieved by varying the duty cycle of the blanking signal, preferably by pulse-width modulation.

Although illustrated as applied to control of an electrochromic mirror element, the principles of the invention can be applied to other devices including windows, glazings, contrast enhancement filters, sunroofs, and the like.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. A vehicular digital electrochromic mirror system, comprising:
   an interior mirror assembly and at least one exterior mirror assembly, said interior mirror assembly comprising an interior electrochromic reflective element and a control, said at least one exterior mirror assembly comprising an exterior electrochromic reflective element;
   said control comprising at least one light sensor and a microcomputer, said microcomputer establishing an interior reflectance value established by a first pulse-width modulated signal for said interior reflective element and an exterior reflectance value established by a second pulse-width modulated signal for said exterior reflective element, said interior reflective element achieving a partial reflectance level in response to the interior reflectance value, said exterior reflectance element achieving a partial reflectance level in response to the exterior reflectance value;
   a vehicle bus communicating the exterior reflectance value to said exterior reflective element;
   said interior mirror assembly comprising at least one additional accessory; and
   said first and second pulse-width-modulated signals determined by:

$$PWM\ \% = G(C_s - V)$$

where
   PWM % is a value of the respective one of said first and second pulse-width-modulated signals expressed as a percentage,
   G is a constant,
   $C_s$ is a voltage at which the respective one of said interior and exterior reflective elements begins coloration, and
   V is a value of an output of said at least one light sensor.

2. The mirror system in claim 1 wherein said at least one additional accessory is selected from the group consisting of a headlamp controller, a map-reading light, an external temperature display, a compass display, a keyless entry system, a video camera internal surveillance system, a video telephone function, a seat occupancy detector, a fuel level display, a vehicle status display, a trip computer function, an intrusion detector, a contacting rain sensor, a non-contacting rain sensor, and a microphone.

3. The mirror system in claim 1 wherein said at least one additional accessory comprises a compass display and a magneto-responsive sensing system comprising one of a magneto-resistive sensor, a magneto-inductive sensor, a magneto-capacitive sensor and a flux-gate sensor.

4. The mirror system in claim 1 wherein said vehicle bus comprises a car area network.

5. The mirror system in claim 4 wherein said at least one exterior mirror assembly comprises a node on said car area network.

6. The mirror system in claim 1 including a plurality of light sensors at said interior mirror assembly, wherein said control determines said interior reflectance value and said exterior reflectance value in response to light sensed by said light sensors.

7. The mirror system in claim 1 wherein said control comprises at least one electronic switch controlled by said microcomputer generating at least one of said first and second pulse-width modulated signals.

8. The mirror system in claim 7 wherein said at least one electronic switch comprises a transistor.

9. The mirror system in claim 1 wherein said at least one exterior mirror assembly comprises at least two exterior mirror assemblies and wherein said control establishes said exterior reflectance value for one of said exterior mirror assemblies and another exterior reflectance value for another of said exterior mirror assemblies.

10. The mirror system in claim 1 wherein said at least one accessory is controlled by said control.

11. The mirror system in claim 1 wherein said at least one accessory is connected with said vehicle bus.

12. The mirror system in claim 1 wherein said at least one additional accessory comprises a compass display and a magneto-resistive sensor.

13. The mirror system in claim 1 wherein said at least one additional accessory comprises a compass display and a magneto-inductive sensor.

14. The mirror system in claim 1 wherein said at least one additional accessory comprises a compass display and a magneto-capacitive sensor.

15. The mirror system in claim 1 wherein said at least one additional accessory comprises a compass display and a flux-gate sensor.

16. A vehicular digital electrochromic mirror system, comprising:
   an interior mirror assembly comprising an interior electrochromic reflective element and a control, a driver side exterior mirror assembly comprising a driver side exterior electrochromic reflective element and a passenger side exterior mirror assembly comprising a passenger side exterior electrochromic reflective element;
   said control comprising at least one light sensor and a microcomputer, said microcomputer establishing an interior reflectance value established by a first pulse-width modulated signal for said interior reflective element, a driver side exterior reflectance value established by a second pulse-width modulated signal for said driver side exterior reflective element, and a passenger side exterior reflectance value established by a third pulse-width modulated signal for said passenger side exterior reflective element, said interior reflective element achieving a partial reflectance level in response to the interior reflectance value, said driver side exterior reflectance element achieving a partial reflectance level in response to the driver side exterior reflectance value, and said passenger side exterior reflective element achieving a partial reflectance level in response to the passenger side reflectance value;
   a vehicle bus communicating the driver side exterior reflectance value to said driver side exterior reflective element and the passenger side exterior reflectance value to said passenger side exterior reflective element;
   said interior mirror assembly comprising at least one additional accessory; and
   said first and second pulse-width-modulated signals determined by:

$$PWM\ \% = G(C_s - V)$$

where
   PWM % is a value of the respective one of said first, second and third pulse-width-modulated signals expressed as a percentage,
   G is a constant,
   $C_s$ is a voltage at which the respective one of said interior, driver side exterior and passenger side exterior reflective elements begins coloration, and V is a value of an output of said at least one light sensor.

17. The mirror system in claim 16, wherein said at least one additional accessory is selected from the group consisting of a headlamp controller, a map-reading light, an external temperature display, a compass display, a keyless entry system, a video camera internal surveillance system, a video telephone function, a seat occupancy detector, a fuel level display, a vehicle status display, a trip computer function, an intrusion detector, a contacting rain sensor, a non-contacting rain sensor, and a microphone.

18. The mirror system in claim 16, wherein said at least one additional accessory comprises a compass display and a magneto-responsive sensing system comprising one of a magneto-resistive sensor, a magneto-inductive sensor, a magneto-capacitive sensor and a flux-gate sensor.

19. The mirror system in claim 16, wherein said vehicle bus comprises a car area network.

20. The mirror system in claim 19, wherein said at least one exterior mirror assembly comprises a node on said car area network.

21. The mirror system in claim 16, including a plurality of light sensors at said interior mirror assembly, wherein said control determines said interior reflectance value and said exterior reflectance value in response to light sensed by said light sensors.

22. The mirror system in claim 16, wherein said control comprises at least one electronic switch controlled by said microcomputer generating at least one of said first and second pulse-width modulated signals.

23. The mirror system in claim 22, wherein said at least one electronic switch comprises a transistor.

24. The mirror system in claim 16, wherein said at least one accessory is controlled by said control.

25. The mirror system in claim 16, wherein said at least one accessory is connected with said vehicle bus.

26. The mirror system in claim 16, wherein said at least one additional accessory comprises a compass display and a magneto-resistive sensor.

27. The mirror system in claim 16, wherein said at least one additional accessory comprises a compass display and a magneto-inductive sensor.

28. The mirror system in claim 16, wherein said at least one additional accessory comprises a compass display and a magneto-capacitive sensor.

29. The mirror system in claim 16, wherein said at least one additional accessory comprises a compass display and a flux-gate sensor.

* * * * *

UNITED STATES PATENT AND TRADEMARK OFFICE
CERTIFICATE OF CORRECTION

PATENT NO. : 6,547,404 B2 Page 1 of 1
DATED : April 15, 2003
INVENTOR(S) : Kenneth L. Schierbeek It is certified that error appears in the above-identified patent and that said Letters Patent is hereby corrected as shown below:

Column 11,
Line 7, "1S" should be -- "15" --.

Column 12,
Line 10, "is" should be -- as --.

Signed and Sealed this

Twenty-eighth Day of December, 2004

JON W. DUDAS
*Director of the United States Patent and Trademark Office*